United States Patent [19]
Kasamatsu et al.

[11] 3,711,387
[45] Jan. 16, 1973

[54] METHOD FOR RADIATION GAS PHASE REACTIONS

[75] Inventors: Tomomichi Kasamatsu, Takasaki-shi; Hiroshi Sakurai, Kohoku-ku, Yokohama-shi, both of Japan

[73] Assignee: Japan Atomic Energy Research Institute

[22] Filed: April 29, 1969

[21] Appl. No.: 820,075

[30] Foreign Application Priority Data

May 6, 1968 Japan..............................43/30189

[52] U.S. Cl. ......204/157.1 H, 204/158 HE, 204/170, 204/175, 204/176, 204/177, 204/164, 204/193, 204/312
[51] Int. Cl..............................B01j 1/10, B01k 1/00
[58] Field of Search .......204/158 HE, 175, 176, 177, 204/157.HE, 157.1 R, 170, 164

[56] References Cited

UNITED STATES PATENTS

| | | | |
|---|---|---|---|
| 904,073 | 11/1908 | Lovejoy | 204/176 |
| 2,637,688 | 5/1953 | Ryan | 204/176 |
| 3,429,793 | 2/1969 | Hellund | 204/157.1 |

FOREIGN PATENTS OR APPLICATIONS

| | | | |
|---|---|---|---|
| 12,541 | 1904 | Great Britain | 204/158 |
| 154,213 | 1922 | Great Britain | 204/158 |

*Primary Examiner*—Howard S. Williams
*Attorney*—Harry G. Bierman, Jordan B. Bierman and Bierman & Bierman

[57] ABSTRACT

When a gas to be gas phase reacted is fed into a reaction zone maintained in the Geiger-Muller region and is irradiated with an ionizing radiation, the gas phase reaction of said gas is promoted because the avalanche of ions is repeated in the Geiger-Muller region by virtue of the irradiation.

4 Claims, 2 Drawing Figures

INVENTORS
TOMOMISHI KASAMATSU AND
HIROSHI SAKURAI

METHOD FOR RADIATION GAS PHASE REACTIONS

This invention relates to the improvement in the method for the gas phase chemical reaction by the radiation.

The prior art is cognizant of many attempts to promote the gas phase reactions. For example, the method for promoting the gas phase reactions by utilizing the electrical energy generated from the discharge, the method for promoting the same by irradiating the system with any radiations, and the like are well known. However, only the production of ozone by the silent discharge is commercially successful because the former method of utilizing the discharge phenomena requests a high voltage and the reaction yield is generally low. The latter method of utilizing the radiation is not yet commercially practiced because the yield by the reaction is not always high.

It is one object of the present invention to provide a method for causing a gas phase reaction at a relatively low voltage and with a small dose in good yield.

A further object of this invention is to provide a method for gas phase reaction by utilizing an ionizing radiation as an electric discharge initiator. A still further object of the invention is to provide a process for the preparation of ozone, hydrogen peroxide, hydrazine etc. wherein said products are obtained more economically than in the prior art.

The above objects of this invention are accomplished by irradiating the reaction zone maintained in the Geiger-Müller region to produce repeatedly an avalanche of ions, thereby an abundance of pair of ions is produced in said zone where the objective gas phase reaction proceeds.

The method mentioned above will be explained by the following facts. In the prior art, the Geiger-Muller region is employed for counting the particles of radiation. In this region, each particle of radiation give rise to each discharge and an avalanche of ions by said discharge is electrically counted. On the other hand, there are many gas phase reactions which depend upon the number of electron and/or ion present or produced, such as ion-molecular reaction. In these reactions, we could employ only the number of ions which corresponds to the energy of the radiation used, or to the amount of the catalyst used. The present inventor conceived the idea that a gas phase reaction would be promoted in an abundance of pairs of ions which is produced in the reaction zone by an ionizing radiation and multiplied by the induction of avalanche of ions. Through numerous experiments, we have found the novel method on the basis of said idea.

As it is well known, when a voltage is applied across two electrodes which have a gas-containing reaction zone therebetween, some phenomena are observed, depending on the relation between numbers of ion pairs produced in the gas and the applied voltage. At the lowest voltage, the recombination region where the number of the produced ion pairs is the least is found. At the highest voltage, the continuous discharge region where the number of the produced ion pairs increases rapidly is found. There are the ionization chamber region, the proportional region, and the Geiger-Müller region in ascending order of the applied voltage between said recombination region and said continuous discharge region. In the continuous discharge region, a discharge sets out without an initiator. And, this discharge is spontaneously eliminated within a very short period of time. This period is usually of $10^{-1} - 10^{-4}$ seconds. Therefore, if the zone is irradiated with an ionizing radiation at the rate of $10 - 10^4$ particles per second, each particle causes an avalanche of ions in the zone to increase rapidly the numbers of positive and negative ions. As a result, the state at which numerous positive and negative ions are present can be quickly repeated during said irradiation. Accordingly, the present inventors recognized that when these phenomena are utilized in a gas phase reaction, said reaction can be duly promoted at a relatively low voltage with a low exposure dose to advantage.

The general procedure for practicing the instant invention is to introduce a gaseous reactant or reactants into a vessel provided with two electrodes, e.g. the well-known Geiger-Müller counter, and maintain the gas pressure within the vessel in the range of 100 to 600 mmHg. A voltage is applied across the electrodes so that the resulted potential gradient in the reaction zone is insufficient to produce a continuous discharge when an ion pair is generated, but sufficient to produce a continuous discharge in the presence of a discharge initiator. Thereafter the reaction zone maintained in the Geiger-Müller region is irradiated with an ionizing radiation to produce repeatedly the avalanche of ions in said zone, whereupon the gas phase reaction takes place. By this process, the objective gas phase reaction can proceed with ease, yet in high yield.

The intended advantages of this invention will become better understood by reference to the following description of a preferred embodiment, in the case of the preparation of ozone, of the invention when read in connection with the accompanying drawing.

Figure 1:
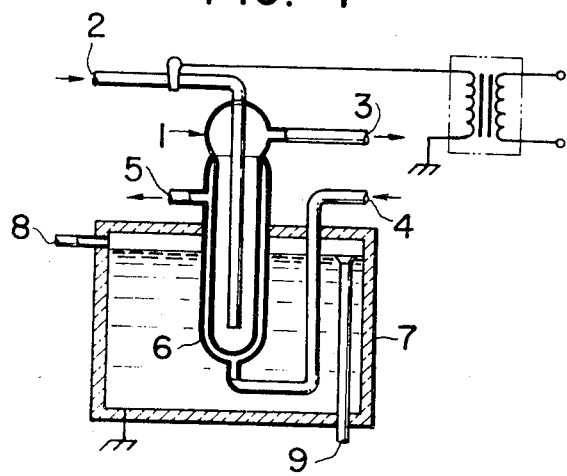
FIG. 1 is a sectional view of one form of the well-known Siemens silent discharge tube.

Referring now to FIG. 1 there is illustrated a reaction tube 1 which comprises a double-walled glass tube having an inlet 2 and an outlet 3 for the cooling water, an inlet 4 for the air as gaseous reactant, an outlet 5 for ozone gas as product, and a reaction zone 6. The reaction tube 1 is received in a cooling trough 7 having an inlet 8 and an outlet 9 for the cooling water. In the case of using the apparatus of FIG. 1, the formation of ozone proceeds by applying a voltage of 10–15 KV across the two electrodes and causing a silent discharge in the reaction zone of about 1.5 mm in width. Usually, the concentration of ozone obtained in this case is not more than about 0.2 ppm.

Figure 2:
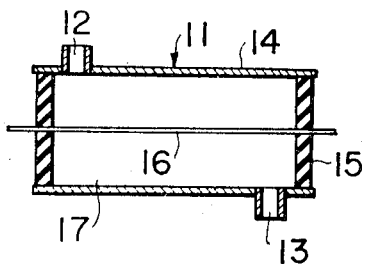
FIG. 2 is a sectional view of a reaction apparatus for preferred embodiments of this invention.

On the contrary, the apparatus illustrated in FIG. 2 is used in one preferred embodiment of this invention. Referring now to FIG. 2 there is shown a reaction vessel 11 which comprises an outer cylindrical tube 14 having an inlet 12 for gas reactant and an outlet 13 as cathode, a closure 15 made of an insulator, and a metal anode 16. When a DC voltage of 6–7 KV is applied with maintaining a suitable reduced pressure of gas and then the reaction zone is irradiated with a radiation from a source (not shown in the figure), an electric discharge immediately takes place in the reaction zone. This discharge is eliminated when the irradiation is stopped, while the avalanches of ions are continuously produced during the irradiation. As the number of ion pairs rapidly increases by virtue of avalanches of electrons which are generated directly proportional to the exposure dose, the formation of ozone in the air which has been introduced into the reaction zone as gas reactant proceeds at a lower voltage than the voltage necessary for the silent discharge in the apparatus of FIG. 1. Moreover, the concentration of ozone formed can be distinctly increased in comparison with the concentration of ozone formed according to the prior art.

It is not always necessary to dispose the radiation source out of the reaction vessel 11 as in the case of FIG. 2. For example, a radiation source of any radioactive isotope per se may be employed as anode.

The method of this invention can be utilized for ozonizing oxygen as mentioned above. In addition, the method can be broadly employed for various gas phase reactions. The preparation of hydrogen peroxide by reacting oxygen with hydrogen and the preparation of hydrazine from ammonia are enumerated as example therefor.

An illustrative radiation which is operable in the method of the present invention is an ionizing radiation, such as $\alpha$-ray, $\beta$-ray, $\gamma$-ray and X-ray. The exposure dose of these rays may be low. For example, when the $\gamma$-ray from the source of cobalt–60 is employed, the exposure dose rate of the extent of 1.0–2.5 mR/hr is operable. In the case of ozone formation, the absorbed dose of 100 mRad can enhance the concentration by 1 percent.

The following examples are presented to illustrate the methods of this invention but are not to be considered as limitative thereon.

Example 1

A reaction vessel (type I) in the form shown by FIG. 2 which has the capacity of 300 ml, an stainless steel cylindrical tube of 33.5 mm in inner diameter and of 38.0 mm in outer diameter as cathode, and a piano wire of 1.0 mm $\phi$ as anode was employed.

The DC voltage of 6.8 KV was applied across the two electrodes and the reaction zone was irradiated with a radiation from the source of cobalt–60 of 1.2 mci to ozonize gaseous oxygen at the room temperature. The results shown in Table 1 were obtained, depending on the gas pressure, the flow rate of gas, and the absorbed dose. In every pair of corresponding cases, the result according to the method of this invention showed a conspicuous increase in the ozone concentration over the result obtained by applying the AC voltage of 15 KV across the two electrodes of a Siemens ozonizer in the form shown in FIG. 1 which has the diameter of 60 mm, the length of 500mm, and the discharge gap of 1.5 mm.

Table 1

| Run No. | Gas pressure mmHg | Flow rate of Gas ml/mm (NTP) | Absorbed Dose ×10⁻³ (Rad) | Concentration of ozone Formed (A) ×10³ppm | Concentration of ozone formed by siemens ozonier (B) ×10³ppm | Ratio of Concentration increase A/B× 100 (%) |
|---|---|---|---|---|---|---|
| 1 | 310 | 171 | 3.8 | 2.87 | 2.39 | 20.1 |
| 2 | 310 | 171 | 5.2 | 3.14 | 2.39 | 31.4 |
| 3 | 310 | 171 | 6.5 | 3.42 | 2.39 | 43.1 |
| 4 | 260 | 171 | 3.8 | 1.11 | 0.614 | 81.4 |
| 5 | 360 | 171 | 3.8 | 0.139 | 0.114 | 21.9 |
| 6 | 260 | 648 | 1.5 | 0.833 | 0.667 | 24.9 |
| 7 | 260 | 1,100 | 0.86 | 0.816 | 0.661 | 23.4 |

Example 2

The DC voltage of 6.8 KV was applied across the two electrodes of the same reaction vessel as in Example 1. On irradiating with an ionizing radiation from the source of cobalt–60 of 1.2 mci at the dose rate of 1.40 mR/hr, various gas mixtures of oxygen and hydrogen were flowed to produce hydrogen peroxide. The results shown in Table 2 were obtained, depending on the oxygen concentration in the gas mixture, the gas pressure, and the flow rate of the gas mixture.

Example 3

Employing a reaction vessel (type II) in the form shown by FIG. 2 which has a stainless cylindrical tube of 35 mm in inner diameter as cathode and a piano wire of 0.3 mm $\phi$ as anode and a reaction vessel (type III) in the form shown by FIG. 2 which has a stainless steel cylindrical tube of 35 mm in inner diameter as cathode and a piano wire of 0.5 mm $\phi$ as anode, various DC voltages were applied. On irradiating with an ionizing radiation from the source of cobalt–60 of 1.2 mci at the dose rate of 2.20 mR/hr, gas ammonia was flowed to produce hydrazine. A glow discharge was maintained in the reaction zone during the irradiation. The results shown in Table 3 were obtained, depending on the flow rate of gas ammonia, the gas pressure, the applied voltage, and the type of the reaction vessel.

Table 2

| Run No. | $O_2$ Concentration (%) | Gas pressure (mmHg) | Flow Rate (l/min) | Amount of $H_2O_2$ Produced (vol.ppm) |
|---|---|---|---|---|
| 8 | 2 | 560 | 1.26 | 0.8 |
| 9 | 2 | " | 0.82 | 1.2 |
| 10 | 0.5 | " | 0.83 | 0.5 |
| 11 | 0.5 | " | 0.42 | 1.8 |
| 12 | 0.5 | " | 0.19 | 3.2 |
| 13 | 0.5 | 610 | 0.88 | 0.6 |

TABLE 3

| Run No. | Flow rate of $NH_3$ (g./hr.) | Gas pressure (mm./Hg) | Applied voltage (kv.) | Electric field strength in the vicinity of the anode (kv./cm.) | Type of reaction vessel used | Amount of hydrazine produced (wt./p.p.m.) |
|---|---|---|---|---|---|---|
| 14 | 11.6 | 250 | 5.7 | 54 | Type III | 82 |
| 15 | 14.7 | 450 | 8.6 | 78 | do | 61 |
| 16 | 11.1 | 200 | 5.7 | 54 | do | 73 |
| 17 | 12.9 | 210 | 5.0 | 70 | Type II | 115 |

What is claimed is:

1. A method for promoting a gas phase reaction comprising the steps of introducing a gaseous reactant into a reaction zone; inducing a potential gradient in said reaction zone which is insufficient in the absence of high energy iouizing radiation to produce a continuous discharge when an ion pair is generated but is sufficient to produce a continuous discharge in the presence of high energy ionizing radiation; irradiating only the Geiger-Muller region of the reaction zone with ionizing high energy radiation to produce ion pairs and an avalanche of ions in said zone, said avalanche of ions acting to multiply said ion pairs whereby said gas phase reaction is promoted.

2. The method according to claim 1 wherein said gaseous reactant is oxygen and ozone is produced by said reaction.

3. The method according to claim 1 wherein said gaseous reactant is oxygen and hydrogen and hydrogen peroxide is produced by said reaction.

4. The method according to claim 1 wherein said gaseous reactant is ammonia and hydrazine is produced by said reaction.

* * * * *